United States Patent
Choi et al.

(10) Patent No.: US 8,204,132 B2
(45) Date of Patent: Jun. 19, 2012

(54) H.264 DECODER EQUIPPED WITH MULTIPLE OPERATION UNITS AND METHOD FOR DECODING COMPRESSED IMAGE DATA THEREOF

(75) Inventors: Kwang-Pyo Choi, Anyang-si (KR); Yun-Je Oh, Yongin-si (KR); Young-Hun Joo, Yongin-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 1297 days.

(21) Appl. No.: 11/904,700

(22) Filed: Sep. 28, 2007

(65) Prior Publication Data

US 2008/0129559 A1 Jun. 5, 2008

(30) Foreign Application Priority Data

Oct. 20, 2006 (KR) ........................ 10-2006-0102598

(51) Int. Cl.
*H04N 11/02* (2006.01)
(52) U.S. Cl. ............... 375/240.25; 375/240.28; 382/233
(58) Field of Classification Search ............. 375/240.25, 375/240.28; 382/233
See application file for complete search history.

(56) References Cited

U.S. PATENT DOCUMENTS

| | | | | |
|---|---|---|---|---|
| 7,139,015 | B2 * | 11/2006 | Eshkoli et al. ............. | 348/14.07 |
| 7,333,545 | B2 * | 2/2008 | Duruoz et al. ............ | 375/240.25 |
| 2005/0265449 | A1 * | 12/2005 | Yoon ........................ | 375/240.12 |
| 2006/0008001 | A1 * | 1/2006 | Lee et al. .................. | 375/240.03 |
| 2006/0023795 | A1 * | 2/2006 | Kim ............................. | 375/242 |
| 2006/0210178 | A1 * | 9/2006 | Hong et al. ................... | 382/232 |
| 2007/0083578 | A1 * | 4/2007 | Chen et al. .................... | 708/203 |
| 2007/0098081 | A1 * | 5/2007 | Vajhallya et al. ........ | 375/240.25 |
| 2007/0133692 | A1 * | 6/2007 | Reddy et al. ............. | 375/240.25 |
| 2008/0056364 | A1 * | 3/2008 | Lyashevsky et al. .... | 375/240.13 |

FOREIGN PATENT DOCUMENTS

| | | |
|---|---|---|
| JP | 2001-197433 | 7/2001 |
| KR | 2001-102899 | 11/2001 |
| KR | 2004-13765 | 2/2004 |
| KR | 2006-49140 | 5/2006 |

OTHER PUBLICATIONS

Yadav, Ganesh, et al.; "MAVD: MPEG-2 Audio Video Decode System on MDSP;" Consumer Electronics, IEEE Symposium; Sep. 1-3, 2004; XP010755736.

Asaduzzaman, Abu, et al.; "Cache Optimization for Embedded Systems Running H.264/AVC Video Decoder;" Computer Systems and Applications, IEEE Conference Mar. 8, 2006; XP010909408.

* cited by examiner

*Primary Examiner* — Gary Mui
(74) *Attorney, Agent, or Firm* — Cha & Reiter, LLC

(57) ABSTRACT

Disclosed is an H.264 decoder equipped with multiple operation units, and a method for decoding compressed image data using same. The decoder comprises a plurality of operation units that successively perform a Variable Length Decoding (VLD) operation, an Inverse Transform & DeQuantization (ITDQ) operation, and an intra PREDiction & inter PREDiction (PRED) operation with respect to a macroblock for which each operation unit is to perform a decoding operation, on receiving information on a macroblock, for which each operation unit is to carry out the decoding operation, with reference to a synchronization information storage unit. When the VLD, ITDQ, and PRED operations have been completed with respect to all macroblocks, the synchronization information storage unit is initialized, and the multiple operation units perform Deblocking Filter (DF) operations with respect to macroblocks for which the operation units are to carry out the DF operations respectively, and then, complete decoding of compressed image data currently received.

25 Claims, 5 Drawing Sheets

H.264 DECODER EQUIPPED WITH MULTIPLE OPERATION UNITS AND METHOD FOR DECODING COMPRESSED IMAGE DATA THEREOF

CLAIM OF PRIORITY

This application claims the benefit of the earlier filing date, under 35 U.S.C. §119(a), to that patent application entitled "H.264 Decoder Equipped with Multiple Operation Units and Method for Decoding Compressed Image Data Thereof," filed in the Korean Intellectual Property Office on Oct. 20, 2006 and assigned Serial No. 2006-102598, the contents of which are hereby incorporated by reference.

BACKGROUND OF THE INVENTION

1. Field of the Invention

The present invention relates to a decoding picture images compressed in the scheme of H.264 encoding, and more particularly to an H.264 decoder equipped with multiple operation units, which performs image decoding processes.

2. Description of the Related Art

It is usual that the development of an H.264 decoder has allowed for an operation model equipped with a single operation unit, such as a single-thread/single-core-based model. In this case, in a process for decoding compressed image data, operations should be performed in sequence. In order to improve an operation rate of an application program based on this kind of operation model, an operating frequency of a hardware processor, i.e., a relevant operation unit, must be raised. However, raising the operating frequency of the hardware processor not only causes the structure of the processor to become more complex, but also raise a rate of power consumption.

In order to solve the above problems, a multi-thread/multi-core based processor adopting multiple operation units, i.e., a plurality of processors, has been developed. At present, the structure of the multiple operation units is embodied in various kinds of forms. The most popular form of the multiple operation units is a combination of a general-purpose Reduced Instruction Set Computer (RISC) processor and a high-rate Digital Signal Processor (DSP). In the case of using processors of this form, the general-purpose RISC processor takes charge of usual types of operations, and the DSP is used in a case of requiring high-rate operations such as operations in multimedia.

In another case of the structure of the multiple operation units in this category, there is a structure of connecting the same kinds of processors in parallel in the form of arrangement. The structure of the multiple operation units of this type adopts an operation model in which each unit processor is assigned an operation suitable for each unit processor to separately perform an operation, or in which operations are performed in the form of pipeline while processors are being connected with one another.

A method of the form of pipeline, in which many processors execute application programs having a large quantity of operations in cooperation with one another has merit in that the operation method can maximize the performance of a processor equipped with multiple operation units. Nevertheless, besides merit, this method of the form of pipeline has a drawback in that the application programs should be divided into several operation blocks. In addition, in order to efficiently carry out an operation according to the operation method of the form of pipeline, the amount of operations of the operation blocks should be similar to one other, and there should be no relation among the blocks. Still, in a case of an H.264 decoding process, the amount of operations is different from one another, and there exists a part which needs a sequential operation among each operation, which incurs a problem in that it is difficult to apply this operation model of the form of pipeline to the H.264 decoding process.

It is usual that an operation block of the H.264 decoding process can be classified into four parts, such as Variable Length Decoding (VLD), Inverse Transform & DeQuantization (ITDQ), intra PREDiction & inter PREDiction (PRED), and Deblocking Filter (DF). The VLD signifies an operation for analyzing a construction of video data (i.e., bit streams) transmitted in a state of compression. The ITDQ denotes an operation for inversely transforming and dequantizing values of coefficients of received macroblocks. The PRED represents operations for making predictions according to an intra mode on the basis of images of the present frames, and for making predictions according to an inter mode on the basis of images of the previous frames. The DF implies an operation for reducing the degradation in quality of a blocking picture of a boundary line among macroblocks. In addition, each operation block has a different amount of operations and it is usual that in each H.264 decoder operation block the ITDQ operation has the smallest amount of operations, while the amount of required operations increases in order of the VLD operation, the DF operation, and the PRED operation. Since the ITDQ and PRED operations can be performed until after the VLD operation is completed, a sequential operation is needed among these operation blocks.

Therefore, in order to apply the operation model of the form of pipeline to the H.264 decoder according to the structure of conventional multiple operation units, a method in which performing an operation proceeds to the next during synchronization among the operation units, centers around an operation unit that performs the VLD operation, is used. In other words, an operation is performed in the way that the operation unit which performs the VLD operation delivers an instruction to another operation unit. For example, when the VLD operation of the first macroblock of a first operation unit has been completed, the first operation unit delivers a signal, which is necessary to perform the ITDQ and PRED operations on the first macroblock, to a second operation unit. Then, while the second operation unit performs the ITDQ and PRED operations on the first macroblock, the first operation unit performs the VLD operation of the second macroblock. Next, when the VLD operation of the second macroblock is completed, the first operation unit delivers a signal, which is necessary to perform the ITDQ and PRED operations on the second macroblock, to a third operation unit. If the VLD operation, the ITDQ operation, and the PRED operation are performed with respect to all macroblocks in this manner, the DF operation is performed.

One operation unit basically carries out the DF operation related to one macroblock. At this time, since a specific macroblock whose DF operation is to be performed is influenced by a result of the DF operation of a macroblock just above the specific macroblock and by a result of the DF operation of another macroblock arranged on the right side of the macroblock just above the specific macroblock, it should be noted that the DF operation cannot be performed with respect to the specific macroblock until after the DF operation has been completed with respect to the other two macroblocks. For instance, in a case of decoding images of a Quarter Common Intermediate Format (QCIF) size as in TABLE 1, in order to carry out the DF operation with respect to the first macroblock (the $23^{rd}$ macroblock, for example) of a row of the third macroblock, the DF operation should be completed with respect to the first macroblock (12th macroblock) and second macroblock (13th macroblock).

TABLE 1

| 1  | 2  | 3  | 4  | 5  | 6  | 7  | 8  | 9  | 10 | 11 |
|----|----|----|----|----|----|----|----|----|----|----|
| 12 | 13 | 14 | 15 | 16 | 17 | 18 | 19 | 20 | 21 | 22 |
| 23 | 24 | 25 | 26 | 27 | 28 | 29 | 30 | 31 | 32 | 33 |
| 34 | 35 | 36 | 37 | 38 | 39 | 40 | 41 | 42 | 43 | 44 |

FIG. 1 is a view illustrating an example of an operation of the form of pipeline decoding picture images compressed in the format of H.264 in the H.264 decoder having the structure of multiple operation units (threads). A usual amount of operations required in the four H.264 decoder operation blocks is normalized to be displayed on the basis of the amount of operations required in the VLD operation in FIG. 1.

A conventional decoding method according to the form of pipeline of the structure of multiple operation units in this manner, has merit in that the method can be simply embodied, but the method can be inefficient in a case where the number of operation units used is small. This is why one operation unit performs only the VLD operation as illustrated in FIG. 1 in a conventional H.264 decoder equipped with multiple operation units. Therefore, waiting time is incurred for VLD operation of the next macroblock to be performed, until after the VLD operation of a prior macroblock has been completed. Moreover, because a case where a video recorder is embodied by assigning a plurality of operation units to the video recorder is rare, a scheme for maximizing an overall performance by efficiently using resources is required in the actual circumstances, even though a small number of operation units is used.

Moreover, since other operation units operate according to a synchronization signal of the operation unit for performing the VLD operation in the current method, the role of the operation unit for performing the VLD operation becomes very important. In other words, because the VLD operation unit takes charge of synchronization of the overall operation units. After all, as the VLD operation unit requires a large quantity of operations, an operation unit having a high operating frequency is used. Still, as described above, since the operation units having a similar level of operating frequency are used in the structure of multiple operation units, it is difficult to assign a high operating frequency only to the operation unit which takes charge of the VLD operation. Hence, it is necessary to distribute the operations required for the synchronization over all operation units of the structure of multiple operation units.

SUMMARY OF THE INVENTION

Accordingly, the present invention has been made to solve the above problems occurring in the prior art and provides additional advantages, by providing an H.264 decoder equipped with multiple operation units, which decodes compressed image data and maximizes an overall performance by efficiently using resources, even though a small number of operation units is used, and a method for decoding the compressed image data in the H.264 decoder equipped with multiple operation units.

One aspect of the present invention is to provide an H.264 decoder equipped with multiple operation units, and a method for decoding the compressed image data of the decoder, both of which distribute the amount of operations required for synchronization among the operation units over all operation units of the structure of multiple operation units.

In one embodiment, there is provided an H.264 decoder equipped with multiple operation units according to an embodiment of the present invention, including a header decoding unit for decoding a Network Adaptation Layer (NAL) header and slice header data of received compressed image data, a memory unit for storing the decoded compressed image data and synchronization information related to each of macroblocks included in the compressed image data, a macroblock assigning unit for assigning numbers to macroblocks for which the multiple operation units are to perform operations, according to the number of multiple operation units, multiple operation units for reading out macroblock data for which each of the multiple operation units is to perform a decoding operation if the macroblocks for which the multiple operation units are to perform the operations are assigned, for performing a second decoding operation of a first macroblock according to a preset condition after performing a first decoding operation with reference to the synchronization information with respect to the first macroblock for which each of the multiple operation units is to perform a decoding operation, for selecting a second macroblock for which each of the multiple operation units is to perform the first and second decoding operations, and for performing a third decoding operation of the macroblocks when the first and second decoding operations of all the macroblocks are completed and a decoding image output unit for outputting results of the operations as decoded image data related to the compressed image data when the third decoding operation of all the macroblocks is completed.

In another embodiment, there is provided a method for decoding the compressed image data in an H.264 decoder equipped with multiple operation units according to an embodiment of the present invention, including the steps of decoding a Network Adaptation Layer (NAL) header and slice header data of received compressed image data, assigning numbers to macroblocks, for which the multiple operation units are to perform initial operations, according to the number of multiple operation units, performing by the multiple operation units a first and second decoding operations of the initially assigned macroblocks with reference to the synchronization information related to the macroblocks if the macroblocks for which the multiple operation units are to perform the initial operations are assigned, selecting a macroblock for which each of the multiple operation units is to perform first and second decoding operations, if the first and second decoding operations of the initially assigned macroblocks are performed, performing a third decoding operation of all the macroblocks when the first and second decoding operations are completed with respect to all the macroblocks of the compressed image data and outputting results of the operations as decoded image data related to the compressed image data when the third decoding operation of all the macroblocks is completed.

BRIEF DESCRIPTION OF THE DRAWINGS

The above features, and advantages of the present invention will be more apparent from the following detailed description taken in conjunction with the accompanying drawings, in which.

DETAILED DESCRIPTION OF THE INVENTION

Figure 1:
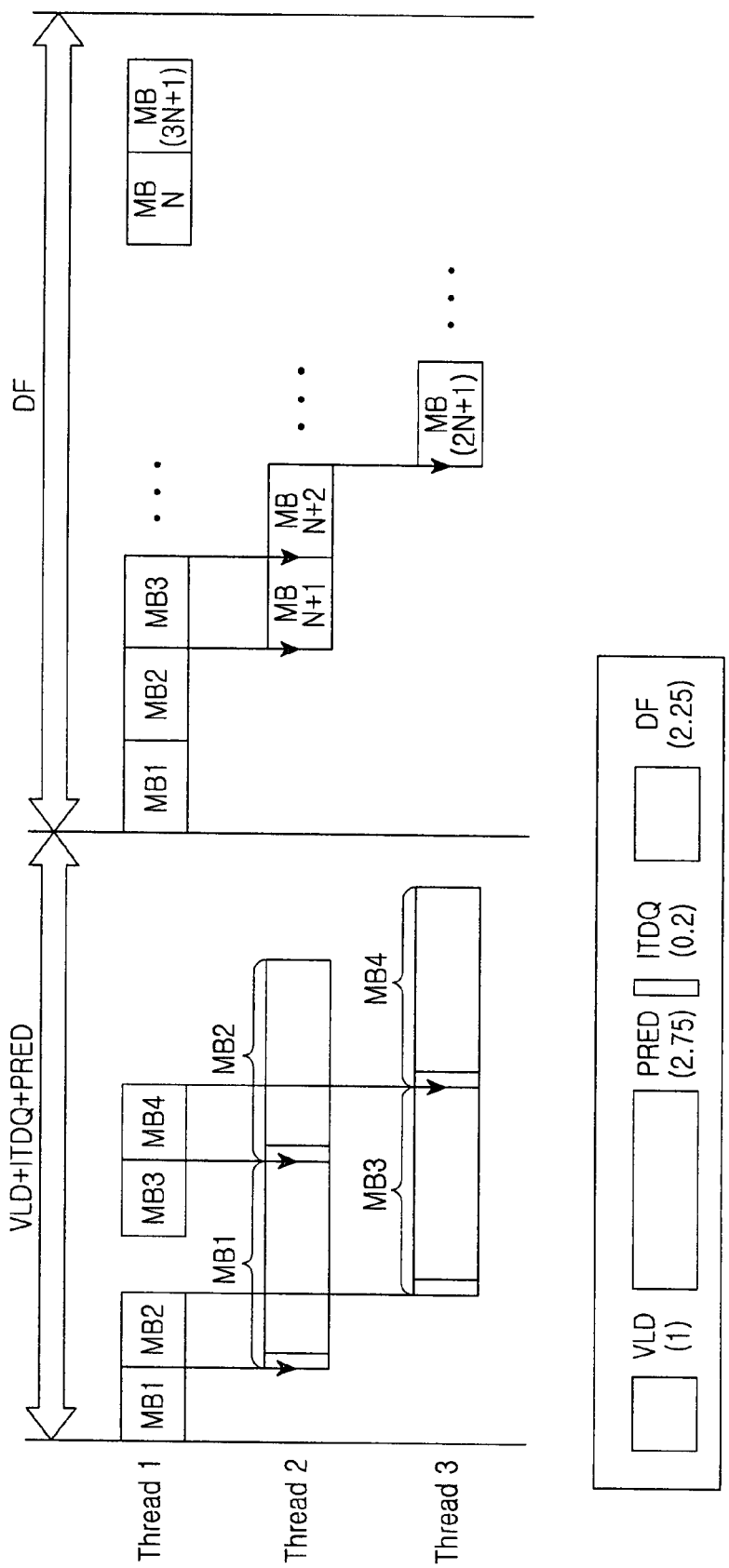
FIG. 1 illustrates an exemplary process in which decoding of compressed image data is produced in the form of pipeline in a conventional H.264 decoder having the structure of multiple operation units.

Hereinafter, embodiments of the present invention will be described with reference to the accompanying drawings. The same elements will be designated by the same reference numerals all through the following description and drawings although they are shown in different drawings. For the purposes of clarity and simplicity, a detailed description of known functions and configurations incorporated herein will be omitted as it may make the subject matter of the present invention rather unclear.

In the present invention, a synchronization information storage unit 210, which includes information on a current decoding process of each MacroBlock (MB) included in compressed image data is included. Further, a plurality of operation units successively perform a Variable Length Decoding (VLD) operation, an Inverse Transform & DeQuantization (ITDQ) operation, and an intra PREDiction & inter PREDiction (PRED) operation with respect to a macroblock for which each operation unit is to carry out a decoding operation, on receiving information on a macroblock, with reference to the synchronization information storage unit 210 (see FIG. 2). When the VLD, ITDQ, and PRED operations have been completed with respect to all macroblocks, the synchronization information storage unit 210 is initialized, and the multiple operation units perform Deblocking Filter (DF) operations with respect to macroblocks for which the operation units are to carry out the DF operations, and then, complete decoding of compressed image data received. In the present invention, each operation unit selects a macroblock for which a respective relevant operation unit is to carry out a decoding operation, and sequentially performs an operation of a decoding operation block related to the selected macroblock. Accordingly, an overall performance can be maximized by efficiently using resources, and the amount of operations required for synchronization among the operation units is distributed over all operation units.

Figure 2:
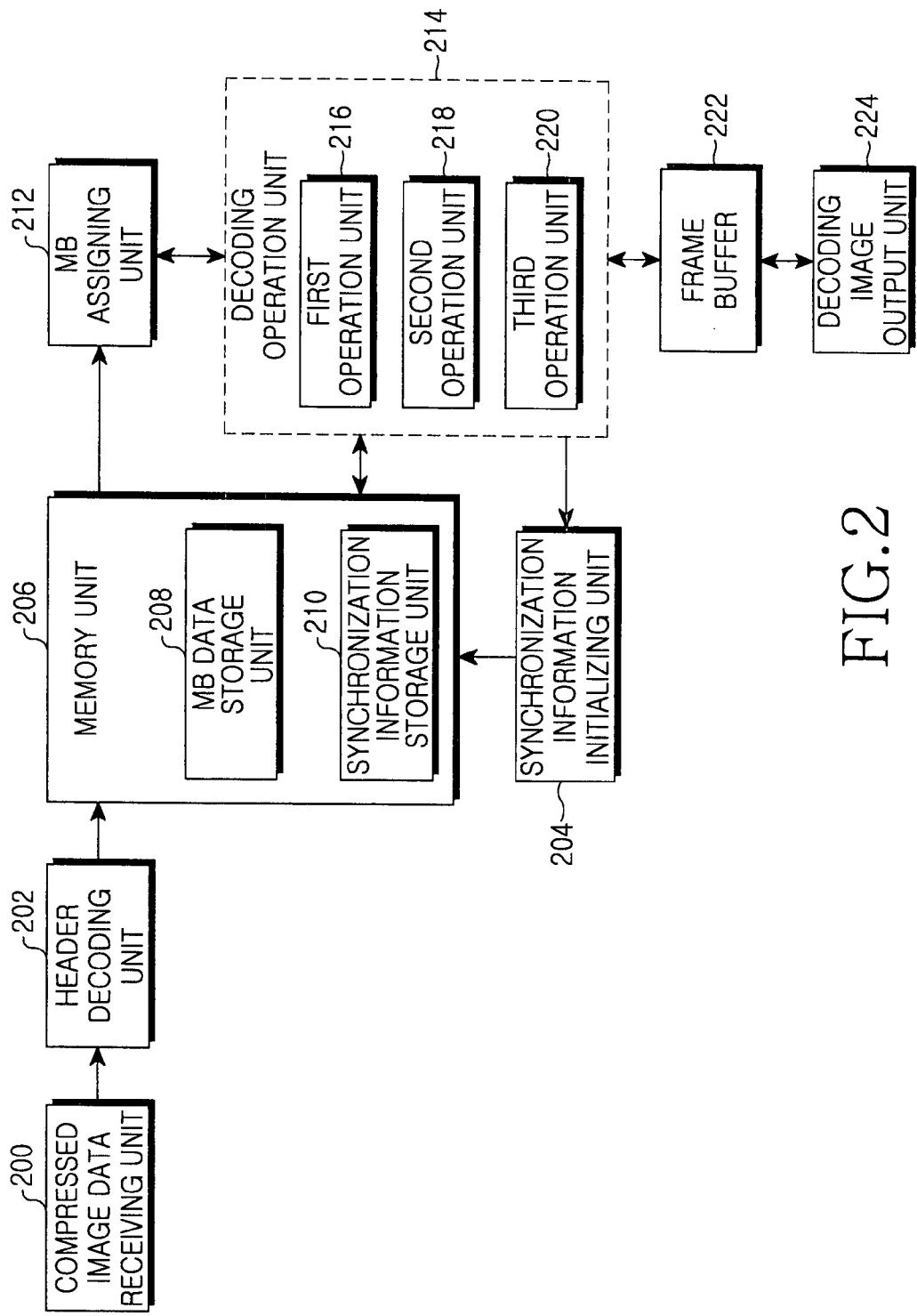
FIG. 2 is a block diagram illustrating the structure of an H.264 decoder equipped with multiple operation units according to an embodiment of the present invention.

FIG. 2 is a block diagram illustrating the structure of an H.264 decoder equipped with multiple operation units according to an embodiment of the present invention.

With reference to FIG. 2, the H.264 decoder equipped with multiple operation units according to an embodiment of the present invention, includes a compressed image data receiving unit 200, a header decoding unit 202, a synchronization information initializing unit 204, a memory unit 206, a macroblock assigning unit 212, a decoding operation unit 214 including a number of operation units, a frame buffer 222, and a decoding image output unit 224. Herein, even though the H.264 decoder according to an embodiment of the present invention is described on the assumption that the H.264 decoder is equipped with three operation units as shown in FIG. 1, the H.264 decoder equipped with three operation units as in FIG. 1 merely represents one embodiment of the present invention. Therefore, it would be recognized by those skilled in the art, that principles of the present invention can be applied even to an H.264 decoder equipped with multiple operation units whose number is less than or more than the exemplary number (three) shown herein.

The compressed image data receiving unit 200 inputs compressed image data from the outside of the H.264 decoder equipped with multiple operation units according to an embodiment of the present invention, and then outputs the input compressed image data to the header decoding unit 202. Next, upon receiving the compressed image data, the header decoding unit 202 decodes a Network Adaptation Layer (NAL) header and slice header data of the received compressed image data, and provides the compressed image data, whose NAL header and slice header have been decoded, to the memory unit 206.

On receiving the compressed image data, whose NAL header and slice header have been decoded, the memory unit 206 stores the received compressed image data. Hereinafter, an area of the memory unit 206 in which the compressed image data whose NAL header and slice header have been decoded is stored, is referred to as "a macroblock data storage unit 208."

In addition, the memory unit 206 is further equipped with another area for storing synchronization information related to each macroblock included in currently received compressed image data. Herein, the synchronization information signifies information regarding a decoding process of each macroblock included in the compressed image data. Furthermore, the synchronization information related to each macroblock stored in the synchronization information storage unit 210 can be classified according to an identification number (e.g., macroblock1, macroblock2, macroblock3, etc.) of a relevant macroblock.

Moreover, the macroblock assigning unit 212 assigns to the operation units the macroblocks which are included in currently received compressed image data and for which the multiple operation units respectively carry out an initial operation according to the number of the operation units currently included in the decoding operation unit 214.

For example, in a case where the number of the operation units included in the exemplary decoding operation unit 214 shown in FIG. 2 is three, the macroblock assigning unit 212 assigns the first, second, and third macroblocks, i.e., MB1, MB2, and MB3, to the first, second, and third operation units 216, 218, and 220, respectively.

The decoding operation unit 214 includes the multiple operation units. When the operation units are assigned the macroblocks, of which the initial operation is performed, by the macroblock assigning unit 212, each of the multiple operation units reads out the macroblock of which the relevant operation unit is to carry out the decoding operation, from the compressed image data stored in the macroblock data storage unit 208 of the memory unit 206. Then, each operation unit sequentially performs the VLD and ITDQ operations of the macroblock, of which the relevant operation unit is to carry out the decoding operation, updates the synchronization information of the relevant macroblock stored in the synchronization information storage unit 210, when the performance of the VLD and ITDQ operations is completed, and records the updated synchronization information thereof.

Moreover, a plurality of the operation units (216, 218, 220) carry out the PRED operation on the macroblock performing the decoding operation, after confirming whether each synchronization information satisfies preset conditions. If the PRED operation of the macroblock is completed, the completed data is stored in the frame buffer 222. And then a plurality of the operation units (216, 218, 220) reflect the completion of the PRED operation of the macroblock to the synchronization information.

Herein, "the preset condition" represents the conditions those conditions which when satisfied enables the decoder of the present invention to perform the method of decoding the compressed image data in the H.264 decoder. That is, in case of the scheme of motion prediction of the macroblock being selected as the intra mode, the decoder of the present invention performs decoding of the compressed image data without compensating movement of the motion. In this case, among the adjacent macroblocks, the PRED operation of the macroblock (for example, the block left of the current macroblock, and the upper block of the current macroblock, hereinafter the block before the completed block. That is the macroblock left of and above the current macroblock is referred to as a completed macroblock) processed prior to the current macroblock has to be completed. The operation unit (214) has to perform the PRED operation of the macroblock currently being decoded, on the basis of the block before the completed block in which the PRED operation is completed. For example, in case of the scheme of the motion prediction corresponding to the intra mode, the operation of the MB8 is performed when the PRED operation is completed with respect to the MB7 if the specific operation unit is performing the decoding operation of the $8^{th}$ macroblock (MB8) at present. At this time, if the macroblock is positioned on the edge (the highest and the most left portion), there exists no macroblock (i.e, a block before the completed block) that has to be processed among the adjacent macroblocks. Thus, the macroblock positioned on the edge has to perform the PRED operation regardless of performance of the PRED operation of the block before the completed block.

In the event that the macroblock is positioned on the edge, even though the intra mode is selected as the scheme of the motion prediction of the macroblock, the operation unit (214) performs the PRED operation of the current macroblock, and it is unnecessary to confirm the completion of the PRED operation of the block before the completed block. Consequently, "the preset condition" is the standard for confirming "the scheme of the motion prediction of the macroblock is the intra mode?", "the PRED operation of the block before the completed block is completed?" and "the macroblock is positioned on the edge?"

Consequently, each operation unit ascertains if the macroblock, for which the relevant operation unit carries out the decoding operation, is a macroblock corresponding to the left edge which does not need a macroblock of a preceding number, and ascertains if a scheme of motion prediction of the relevant macroblock corresponds to the intra mode in a case of the macroblock that is not the a left edge macroblock. In a case when the relevant macroblock corresponds to a macroblock according to the intra mode, each operation unit ascertains if the PRED operation of the relevant macroblock is completed through synchronization information related to a macroblock according to the preceding number, and performs the PRED operation of the macroblock of which the relevant operation unit carries out the decoding operation. If the PRED operation is completed, each operation unit updates synchronization information related to the relevant macroblock, and displays the updated synchronization information. Thereafter, the decoding unit 214 stores the macroblocks whose decoding operations are currently completed in the frame buffer 222.

Moreover, in a case when the VLD, ITDQ, and PRED operations are completed with respect to the macroblocks of which the operation units 216, 218, and 220 respectively perform the decoding operations, the operation units 216, 218, and 220 respectively choose new macroblocks on the basis of numbers of the macroblocks whose decoding operations are currently performed. Herein, a scheme in which each of the operation units select the new macroblocks, can be executed as in Equation 1.

numbers of new MBs=numbers of MBs whose decoding is currently performed+the number of overall operation units [1]

Next, each operation unit carries out the above-mentioned process of VLD, ITDQ, and PRED operations with respect to a newly selected macroblock over again. In a case when a number of the above newly selected macroblock is larger than a number of the last macroblock among macroblocks included in compressed image data stored in the macroblock data storage unit 208, the decoding operation unit 214 determines that the decoding operation is completed with respect to all macroblocks included in the compressed image data whose decoding is being performed. If all the operation units determine that the decoding operation is completed with respect to all the macroblocks included in the compressed image data whose decoding is being performed, the decoding operation unit 214 transfers a determination signal to the synchronization information initialization unit 204. Then, the synchronization information initialization unit 204 initializes currently stored synchronization information.

Next, the operation units 216, 218, and 220 perform the DF operations with respect to the macroblocks whose VLD, ITDQ, and PRED operations are currently completed, on the basis of numbers of the macroblocks which have been assigned to the operation units by the macroblock assigning unit 212, and whose initial operations have been performed. That is, the DF operation can be performed by the same operation unit which has performed the VLD, ITDQ, and PRED operations of the specific macroblock as shown in Equation 1. For example, in a case as such shown in FIG. 2, numbers of the macroblocks whose VLD, ITDQ, and PRED operations are performed by the first operation unit 216, are MB1, MB4, MB7, etc., according to Equation 1. In this case, the DF operations of MB1, MB4, and MB7 are performed by the first operation unit 216. The operation units 216, 218, and 220 respectively perform the DF operations of the remaining macroblocks according to the process of the DF operation illustrated in FIG. 1.

Meanwhile, if the DF operation has been completed with respect to all the macroblocks stored in the frame buffer 222, the frame buffer 222 provides the macroblocks, whose DF operations have been completed, to the decoding image output unit 224. Then, the decoding image output unit 224 receives the input macroblocks to output decoded image data in response to the received compressed image data. Accordingly, in the H.264 decoder according to the described embodiment of the present invention, each operation unit selects a macroblock of which each relevant operation unit is to carry out the decoding operation, and sequentially performs the VLD, ITDQ, and PRED operations of the selected macroblock. Accordingly, the amount of operations required for synchronization among the operation units is distributed over all operation units, and resources of the operation units are efficiently utilized.

Figure 3:
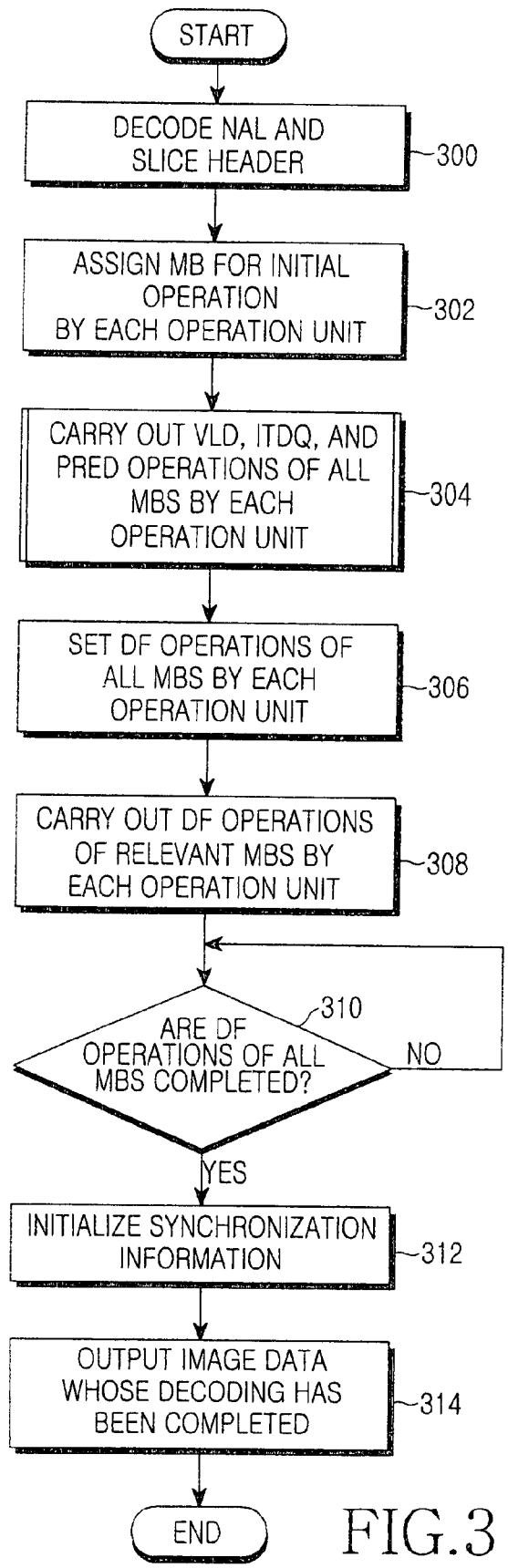
FIG. 3 is a flowchart illustrating an exemplary process of an H.264 decoder equipped with multiple operation units according to an embodiment of the present invention.

FIG. 3 is a flowchart illustrating an exemplary process of an H.264 decoder equipped with multiple operation units according to one exemplary embodiment of the present invention.

With reference to FIG. 3, the H.264 decoder equipped with multiple operation units, upon receiving compressed image data, the H.264 decoder proceeds to step 300 to decode an NAL header and a slice header of the compressed image data, and stores the compressed image data whose NAL header and slice header have been decoded. Next, the H.264 decoder proceeds to step 302 to respectively assign macroblocks, of which an initial operation is to be performed by each relevant operation unit, to the operation units. Herein, an assignment of the macroblocks is sequentially accomplished by the number of the operation units currently included in the decoding operation unit 214, and according to the number of the operation units. For instance, in a case where the number of the operation units are three; the first, second, and third macroblocks are respectively assigned to the first, second, and third operation units among the macroblocks whose initial operations are to be performed.

Next, each operation unit carries out VLD, ITDQ, and PRED operations of a macroblock which is currently and initially assigned to the pertinent operation unit. If the VLD, ITDQ, and PRED operations of the macroblock currently and initially assigned are completed, the VLD, ITDQ, and PRED operations are performed with respect to all macroblocks of the received compressed image data, on the basis of a number of the initially assigned macroblock. Herein, the PRED operation can be performed according to preset conditions as described above. Step 304 illustrated in FIG. 3 is more specifically described in FIG. 4.

If the VLD, ITDQ, and PRED operations are completed with respect to all the macroblocks of the compressed image data, with the performance of the decoding operation by each operation unit, the H.264 decoder equipped with multiple operation units according to the described embodiment of the present invention, proceeds to step 306, and sets, by each of the operation units, the DF operation of the macroblocks whose VLD, ITDQ, and PRED operations have been completed. After that, the H.264 decoder proceeds to step 308 to carry out the DF operation of each macroblock by using the multiple operation units according to setting of the DF operation. Herein, the DF operation is achieved in the same way as in the conventional H.264 decoder having the structure of multiple operation units.

The H.264 decoder equipped with multiple operation units according to the described embodiment of the present invention, proceeds to step 310 to check if the DF operation has been completed with respect to all the macroblocks of the compressed image data. If the DF operation has been completed with respect to all the macroblocks as a result of checking in step 310, the H.264 decoder proceeds to step 312 to initialize synchronization information related to all the macroblocks of the currently decoded compressed image data. Then, the H.264 decoder proceeds to step 314 to output image data whose decoding has been currently completed. Accordingly, in the H.264 decoder according to the described embodiment of the present invention, each operation unit selects a macroblock of which each relevant operation unit is to carry out the decoding operation, and performs the decoding operation of the selected macroblock. Accordingly, the amount of operations required for synchronization among the operation units is distributed over all operation units, and resources of the operation units are efficiently utilized.

Figure 4:
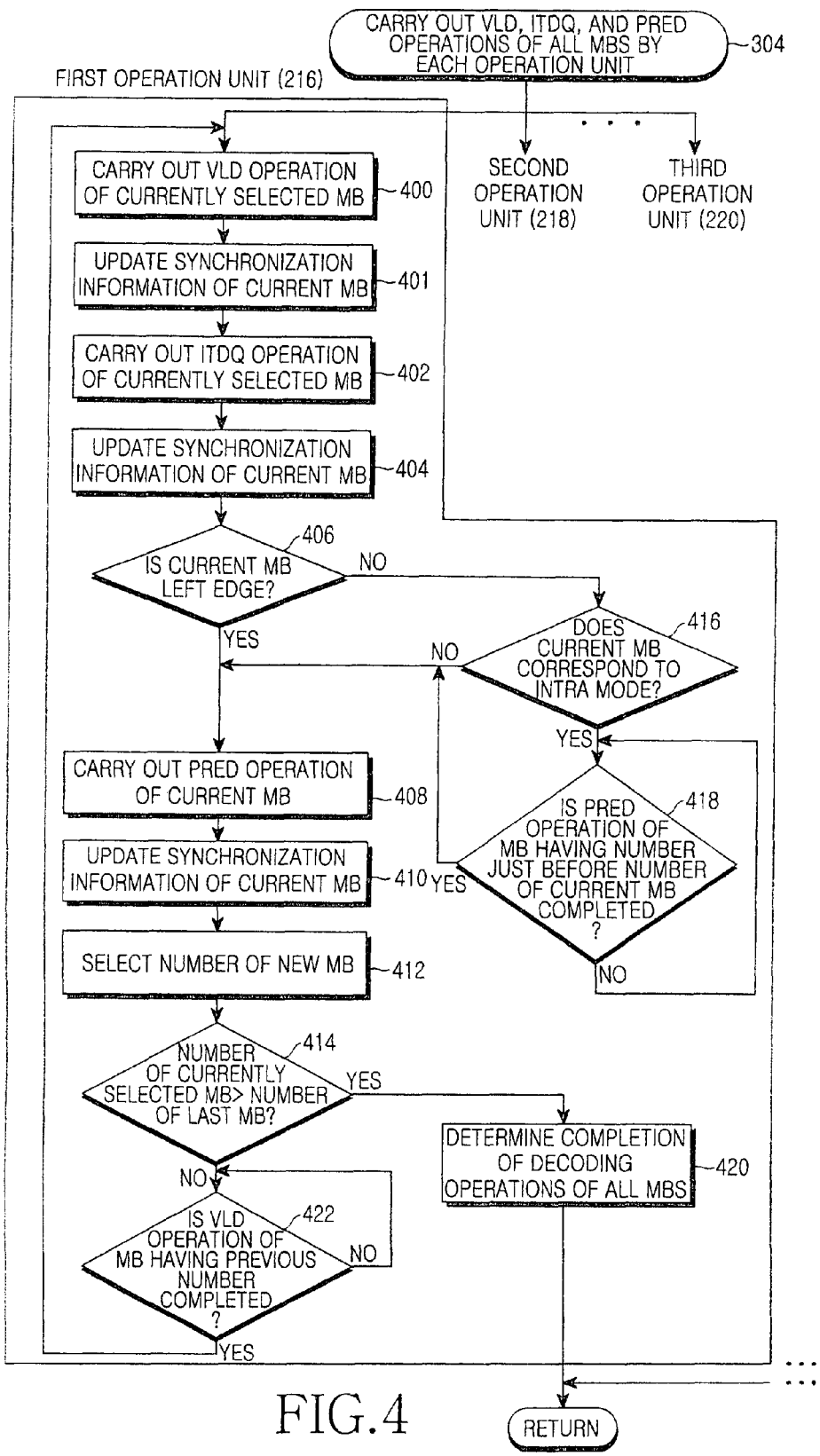
FIG. 4 is a flowchart illustrating an exemplary process in which VLD, ITDQ, and PRED operations of a MacroBlock (MB) are performed by each operation unit in an H.264 decoder equipped with multiple operation units according to an exemplary embodiment of the present invention.

FIG. 4 is a flowchart illustrating an exemplary process in which VLD, ITDQ, and PRED operations of a MacroBlock (MB) are performed by each operation unit in an H.264 decoder equipped with multiple operation units according to the described embodiment of the present invention.

Referring to FIG. 4, if the macroblocks, of which an initial operation is to be performed by each relevant operation unit, are respectively assigned to the operation units in step 302, the first operation unit 216 proceeds to step 400 to perform the VLD operation of the macroblock selected by the macroblock assigning unit 212. If the VLD operation of the relevant macroblock is completed, the first operation unit 216 proceeds to step 401 to update synchronization information related to the relevant macroblock, and then records that the VLD operation is completed. If the VLD operation is completed with respect to the current macroblock, another operation unit, i.e., either the second operation unit 218 or the third operation unit 220, refers to the synchronization information related to the current macroblock to confirm that the VLD operation has been completed with respect to the current macroblock, and carries out the VLD operation of a macroblock having the next identification number.

The VLD operation is then sequentially performed according to the block identification number. Therefore, the results of the VLD operations of the macroblocks are synchronized with the operation units 216, 218, and 220 in the present invention. Each of the operation units 216, 218, and 220 refers to synchronization information related to a macroblock having an identification number just before another identification number of a newly selected macroblock checks whether the VLD operation has been completed with respect to the previous macroblock and performs the VLD operation of the currently selected macroblock according to whether the VLD operation has been completed.

The first operation unit 216 proceeds to step 402 to carry out the ITDQ operation of the currently selected macroblock. Then, the first operation unit 216 proceeds to step 404 to update the synchronization information related to the currently selected macroblock, and displays that the VLD and ITDQ operations are completed. Herein, the update of the synchronization information can separately display the completion of the VLD operation from the completion of the ITDQ operation. In this case, step 404 can further include a process of updating synchronization information in which the completion of the VLD operation is reflected in the synchronization information of the relevant macroblock after the VLD operation of the currently selected macroblock has been completed. In this case, step 404 corresponds to a process in which only the completion of the ITDQ operation of the currently selected macroblock is reflected in the synchronization information related to the currently selected macroblock.

On the other hand, in the process of steps 400 to 404, if the VLD and ITDQ operations have been completed with respect to the currently selected macroblock, and if the completion of the operations is reflected in the synchronization information, the first operation unit 216 proceeds to step 406 to determine if the currently selected macroblock is a macroblock corresponding to a left edge. If the currently selected macroblock is the macroblock corresponding to the left edge, the first operation unit 216 proceeds to step 408 to perform the PRED operation of the current macroblock.

However, if the currently selected macroblock is not the macroblock corresponding to the left edge as a result of determining in step 406, the first operation unit 216 proceeds to step 416 to determine if the currently selected macroblock corresponds to a macroblock according to an intra mode. If the currently selected macroblock corresponds to a macroblock which performs a motion prediction according to an inter mode and not according to an intra mode, the first operation unit 216 proceeds to step 408 to perform the PRED operation of the current macroblock.

However, if the currently selected macroblock corresponds to a macroblock, which performs the motion prediction according to the intra mode, as a result of determining in step 416, the first operation unit 216 proceeds to step 418 to check if the PRED operation has been completed with reference to synchronization information related to the macroblock according to the preceding number (i.e., an identification number of a macroblock, obtained by subtracting '1' from an identification number of the currently selected macroblock) of the currently selected macroblock. If the PRED operation has not been completed with respect to the macroblock according to the preceding number of the currently selected macroblock, as a result of referring to the synchronization information, the first operation unit 216 is on standby until the PRED operation is completed with respect to the macroblock according to the preceding number of the currently selected macroblock.

However, if the PRED operation has been completed with respect to the macroblock according to the preceding number of the currently selected macroblock, as a result of checking in step 418, the first operation unit 216 proceeds to step 408 to carry out the PRED operation of the current macroblock.

If the PRED operation of the current macroblock is completed, the first operation unit 216 proceeds to step 410 to update the synchronization information related to the current macroblock, and reflects the completion of the PRED operation of the current macroblock on the synchronization information related to the relevant macroblock. Next, the first operation unit 216 proceeds to step 412 to select an identification number of a new macroblock of which the VLD, ITDQ, and PRED operations will be performed. Herein, the selection of the identification number of the new macroblock can be accomplished in the way shown in Equation 1.

If the identification number of the new macroblock is selected in step 412, the first operation unit 216 proceeds to step 414 to check if the identification number of the currently selected macroblock is larger than an identification number of the last macroblock among macroblocks included in the currently received compressed image data. If the identification number of the currently selected macroblock is smaller than an identification number of the last macroblock, the first operation unit 216 proceeds to step 422 to ascertain if the VLD operation has been completed with respect to a macroblock having an identification number just before the currently selected identification number. The completion of the VLD operation can be ascertained with reference to the synchronization information related to a macroblock having the identification number just before the currently selected identification number. If the VLD operation has not been completed with respect to the macroblock having the identification number just before the currently selected identification number, the first operation unit 216 is on standby until the VLD operation is completed with respect to the macroblock having the identification number just before the currently selected identification number. However, if the VLD operation has been completed with respect to the macroblock having the identification number just before the currently selected identification number, the first operation unit 216 returns back to step 400 to carry out the VLD operation of a currently selected macroblock, and repeatedly performs the process of steps 402 to 412. However, if the identification number of the newly selected macroblock is smaller than the identification number of the last macroblock, the first operation unit 216 proceeds to step 420 to determine that the VLD, ITDQ, and PRED operations have been completed with respect to the macroblocks, of which the first operation unit 216 should carry out an operation, among all macroblocks of the currently received compressed image data, and completes the process of carrying out the VLD, ITDQ, and PRED operations of the macroblocks.

The process of steps 400 to 416 occurs in the second operation unit 218 and the third operation unit 220, in the same manner as in the first operation unit 216. Hence, if the third operation unit 220 determines that the VLD, ITDQ, and PRED operations have been completed with respect to the macroblocks, of which the third operation unit 220 should carry out an operation, among all macroblocks of the currently received compressed image data, the H.264 decoder equipped with multiple operation units according to the described embodiment of the present invention, determines that the VLD, ITDQ, and PRED operations are completed with respect to all the macroblocks of the currently received compressed image data, and proceeds to step 306 illustrated in FIG. 3.

Figure 5:
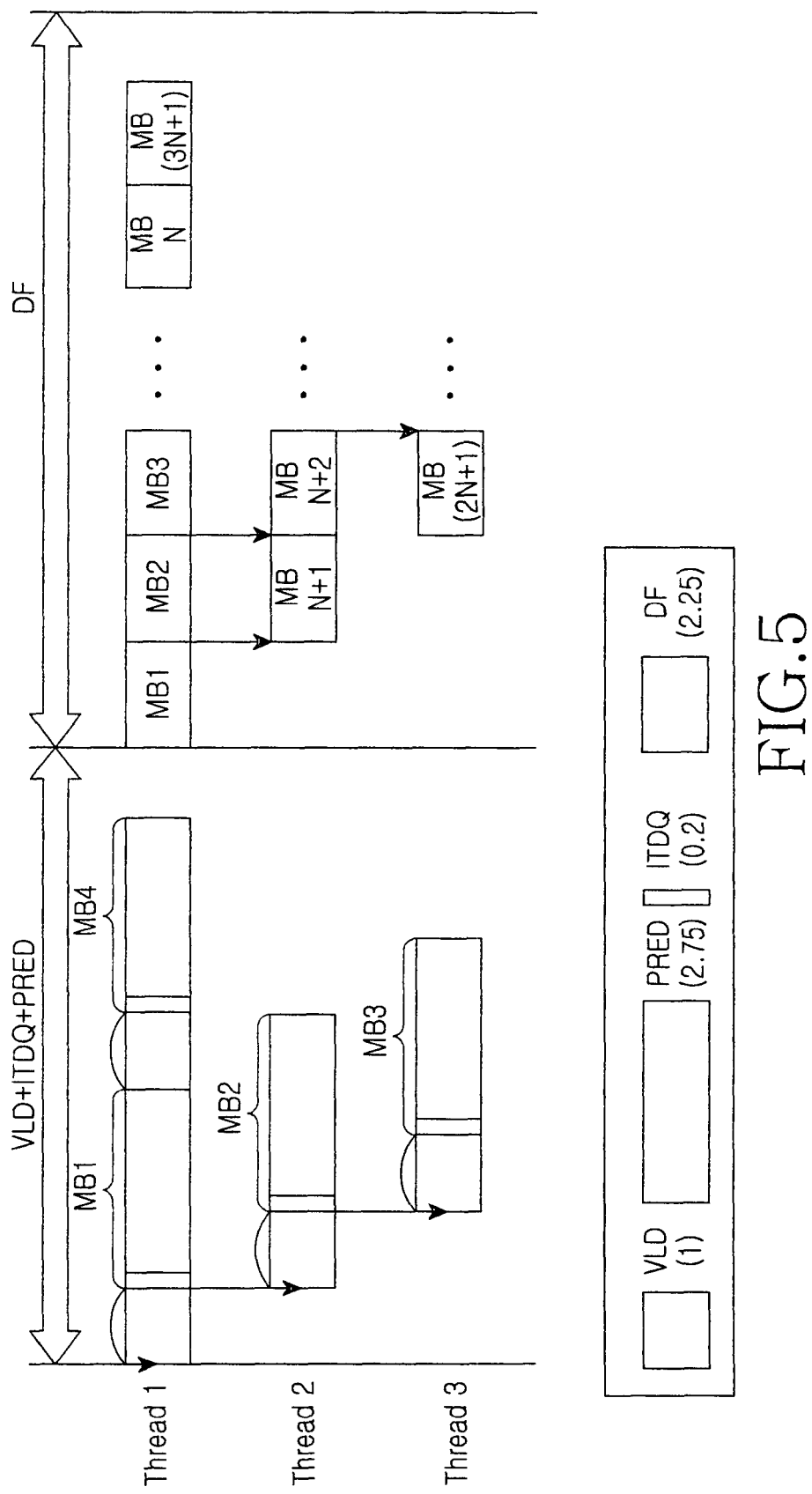
FIG. 5 illustrates an exemplary decoding process of compressed image data in an H.264 decoder equipped with multiple operation units according to an embodiment of the present invention.

FIG. 5 illustrates an exemplary decoding process of compressed image data in an H.264 decoder equipped with multiple operation units according to an embodiment of the present invention.

With reference to FIG. 5, in the H.264 decoder equipped with multiple operation units according to the described embodiment of the present invention, contrary to that shown in FIG. 1, it is shown that each operation unit (i.e., each thread) performs the VLD, ITDQ, and PRED operations. On this, the first idle time between first and second macroblocks, and the second idle time between third and fourth macroblocks, as illustrated in an operation unit 1 (i.e., a thread 1) of FIG. 1, are not generated in the present invention. In the present invention, each relevant operation unit selects, by itself, a macroblock upon which it will perform the decoding operation, and therefore, a gathering problem of a synchronization operation which may be incurred in a state of FIG. 1, is not caused. Consequently, in the present invention, an availability factor of resources of each operation unit can be maximized, even though a small number of operation units is used. Moreover, the amount of operations required for synchronization can be prevented from gathering together to a specific operation unit (i.e., bottleneck).

The merits and effects of the embodiments of the present invention described herein are further described as follows.

In the H.264 decoder equipped with multiple operation units according to embodiment of the present invention, an overall performance can be maximized by efficiently using resources of the operation units even though a small number of operation units is used, and the amount of operations required for synchronization among the operation units can be distributed over all operation units.

While the invention has been shown and described with reference to a certain preferred embodiment thereof, it will be understood by those skilled in the art that various changes in form and details may be made therein without departing from the spirit and scope of the invention. Specially, even though an H.264 decoder according to an embodiment of the present invention is described on the assumption that the H.264 decoder is equipped with three operation units, it would be recognized that embodiments of the present invention can be applied even to an H.264 decoder equipped with multiple operation units whose number is less than or more than three. Therefore, the spirit and scope of the present invention must be defined not by described embodiments thereof but by the appended claims and equivalents of the appended claims.

What is claimed is:

1. An H.264 decoder equipped with a plurality of operation units, the H.264 decoder comprising:
 a header decoding unit for decoding a Network Adaptation Layer (NAL) header and slice header data of received compressed image data;

a memory unit for storing the decoded compressed image data and synchronization information related to each macroblock included in the compressed image data;

each of the plurality of operation units:
reading out data of a macroblock upon which a decoding operation is to be performed;
performing a first decoding operation of the macroblock with reference to synchronization information related to the macroblocks, wherein the first decoding operation is an operation for decoding data including information needed to determine an operation order of macroblocks;
updating the synchronization information according to a result of the first decoding operation;
performing a second decoding operation of the macroblock according to a preset condition and the updated synchronization information;
performing a third decoding operation of macroblocks when the first and second decoding operations of all the macroblocks included in the compressed image data are completed, wherein the third decoding operation is an operation for reducing a degradation in quality of a blocking picture of a boundary line among the macroblocks, a macroblock assigning unit determining numbers of macroblocks for which the plurality of operation units perform operations and providing the numbers of macroblocks to respective ones of the operation units; and a decoding image output unit for outputting results of the operations as decoded image data related to the compressed image data when the third decoding operation of all the macroblocks included in the compressed image data is completed.

2. The H.264 decoder as claimed in claim 1, wherein the plurality of operation units reflect the completion of their performance in the synchronization information related to a relevant macroblock, when the performance of the first and second decoding operations related to the relevant macroblock has been completed.

3. The H.264 decoder as claimed in claim 2, wherein the preset condition is selected from the group consisting of: whether or not a scheme of motion prediction of the macroblock corresponds to an intra mode, a position of the macroblock, and a result of the performance of the second decoding operation of a macroblock according to the preceding number of macroblock.

4. The H.264 decoder as claimed in claim 3, wherein each of the plurality of operation units performs the second decoding operation if the scheme of motion prediction of the macroblock is not according to the intra mode, and carries out the second decoding operation, according to whether or not the macroblock is a macroblock corresponding to a left edge, if the scheme of motion prediction of the macroblock is according to the intra mode.

5. The H.264 decoder as claimed in claim 4, wherein each of the plurality of the operation units performs the second decoding operation, according to a result of the performance of the second decoding operation of a macroblock according to the preceding number of macroblock, if the macroblock is not the macroblock corresponding to the left edge.

6. The H.264 decoder as claimed in claim 3, wherein each of the plurality of the operation units ascertain a result of performance of the second decoding operation with respect to a macroblock according to the preceding number of macroblock with reference to the synchronization information.

7. The H.264 decoder as claimed in claim 1, wherein each of the plurality of the operation units select a macroblock, whose decoding operation is to be performed on the basis of a number of a macroblock assigned by the macroblock assigning unit, and the number of the multiple operation unit.

8. The H.264 decoder as claimed in claim 1, wherein the first, second, and third decoding operations respectively carry out operations of Variable Length Decoding (VLD) and Inverse Transform & DeQuantization (ITDQ) operation blocks, an operation of an intra PREDiction & inter PREDiction (PRED) operation block, and an operation of a Deblocking Filter (DF) operation block.

9. The H.264 decoder as claimed in claim 8, wherein each of the plurality of the operation units carry out the PRED operation according to the ITDQ operation and the preset condition, if the VLD operation of a macroblock according to the preceding number of a selected macroblock has been completed, with reference to the synchronization information.

10. The H.264 decoder as claimed in claim 1, which further comprises:
a synchronization information initializing unit for initializing the synchronization information, if the third decoding operation is completed with respect to all the macroblocks.

11. The H.264 decoder as claimed in claim 1, further comprising:
an initialization unit for performing an initial operation by assigning numbers of the macroblocks from the macroblock assigning unit; and
automatically selecting the macroblock performing the operation.

12. A method for decoding compressed image data in an H.264 decoder equipped with multiple operation units, the method comprising the steps of:
(1) decoding a Network Adaptation Layer (NAL) header and slice header data of received compressed image data;
(2) assigning numbers to macroblocks for which the multiple operation units are to perform operations,
(3) performing a first decoding operations of the assigned macroblocks with reference to synchronization information related to the macroblocks;
(4) updating the synchronization information according to a result of the first decoding operation;
(5) performing a second decoding operation of the macroblock according to a preset condition and the updated synchronization information;
(6) performing a third decoding operation of all the macroblocks included in the compressed image data when the first and second decoding operations are performed with respect to all the macroblocks included in the compressed image data, wherein the third decoding operation is an operation for reducing a degradation in quality of a blocking picture of a boundary line among the macroblocks; and
(7) outputting results of the operations as decoded image data related to the compressed image data when the third decoding operation of all the macroblocks included in the compressed image data is completed.

13. The method as claimed in claim 12, wherein step (2) comprises a step of:
selecting a macroblock, whose decoding operation is to be performed on the basis of a number of a macroblock initially assigned, and of the number of the multiple operation units, after the second decoding operation has been performed.

14. The method as claimed in claim 12, wherein step (3) comprises the steps of:
(A) carrying out the first decoding operations with respect to macroblocks assigned to relevant operation units, by the multiple operation units;
(B) indicating the completion of the first decoding operations of the macroblocks assigned to the relevant operation units in the synchronization information stored for each macroblock;
(C) carrying out the second decoding operations according to preset conditions, after the first decoding operations of the macroblocks assigned to the relevant operation units have been completed; and
(D) indicating the completion of the second decoding operations in synchronization information of relevant macroblocks, after the second decoding operation of the macroblocks initially assigned to the relevant operation units have been completed.

15. The method as claimed in claim 14, wherein the preset conditions is selected from the group consisting of: whether or not a scheme of motion prediction of the macroblock corresponds to an intra mode, a position of the macroblock, and a result of the performance of the second decoding operation block of a macroblock according to the preceding number of macroblock.

16. The method as claimed in claim 15, wherein step (3) comprises the steps of:
(a) ascertaining whether the macroblock is a macroblock corresponding to a left edge;
(b) checking if a scheme of motion prediction of the macroblock corresponds to an intra mode, in a case when the macroblock is not the macroblock corresponding to the left edge; and
(c) carrying out the second decoding operation according to a result of the performance of the second decoding operation of a macroblock according to the preceding number of macroblock, if the scheme of motion prediction of the macroblock is according to the intra mode.

17. The method as claimed in claim 16, wherein step (a) further comprises a step of:
performing the second decoding operation, if the macroblock is the macroblock corresponding to the left edge.

18. The method as claimed in claim 16, wherein step (b) further comprises a step of:
performing the second decoding operation, if the scheme of motion prediction of the macroblock corresponds to the intra mode.

19. The method as claimed in claim 16, wherein step (c) comprises a step of:
confirming a result of performance of the second decoding operation with respect to a specific macroblock according to the preceding number of macroblock with reference to synchronization information corresponding to the specific macroblock according to the preceding number of macroblock.

20. The method as claimed in claim 12, wherein step (6) comprises a step of:
selecting a macroblock, whose decoding operation is to be performed, on the basis of a number of the macroblock assigned, and of the number of the multiple operation units, after the second decoding operation has been performed.

21. The method as claimed in claim 12, which further comprises a step of:
initializing the synchronization information, after the third decoding operation is completed with respect to all the macroblocks.

22. The method as claimed in claim 12, wherein the first, second, and third decoding operations respectively carry out operations of Variable Length Decoding (VLD) and Inverse Transform & DeQuantization (ITDQ) operation blocks, an operation of an intra PREDiction & inter PREDiction (PRED) operation block, and an operation of a Deblocking Filter (DF) operation block.

23. The method as claimed in claim 12, wherein step (6) comprises the steps of:
selecting macroblocks whose first and second decoding operations are to be performed, after the first and second decoding operations are performed;
determining if VLD operations are completed with respect to macroblocks according to the preceding numbers of currently selected macroblocks with reference to the relevant synchronization information, by the multiple operation units;
carrying out the VLD operations of the currently selected macroblocks, after the VLD operations have been completed with respect to the macroblocks according to the preceding numbers, by the multiple operation units;
carrying out ITDQ operations of the relevant macroblocks which are currently selected, after the VLD operations have been completed, by the multiple operation units; and
performing PRED operations of the relevant macroblocks which are currently selected according to preset conditions, after the ITDQ operations have been completed, by the multiple operation units.

24. The method for decoding compressed image data, as recited in claim 12, wherein the step (2) further comprises the step of
assigning the macroblock for which each of the multiple operation units is to perform the initial operation.

25. The method of claim 12, wherein the step (3) further comprises the step of
automatically assigning the macroblock performing the first and the second decoding operations.

* * * * *